Dec. 17, 1968 W. J. SHAUGHNESSY 3,417,319
CONSTANT CURRENT APPARATUS
Filed Dec. 13, 1965

INVENTOR.
William Shaughnessy
BY
Eli Weiss
ATTORNEY

United States Patent Office 3,417,319
Patented Dec. 17, 1968

3,417,319
CONSTANT CURRENT APPARATUS
William J. Shaughnessy, Basking Ridge, N.J., assignor to American Standard Inc., a corporation of Delaware
Filed Dec. 13, 1965, Ser. No. 513,172
8 Claims. (Cl. 323—4)

ABSTRACT OF THE DISCLOSURE

A regulating circuit arrangement for supplying substantially constant direct current to a load, the arrangement being controlled so that amplitude of the current to the load will be negligibly affected by changes in the characteristics of the load or by changes in such parameters as temperature or age. The current supplied to the load is fed through a regulating transistor. The current through that transistor is maintained substantially constant by virtue of a feed-back control circuit which modulates the voltage applied to the control terminal of the regulating transistor to compensate for changes in the load or in certain characteristics of the transistor. The feed-back control circuit compares the current through a resistor with the current supplied to a reference point, and the arrangement acts in a way so as to reduce any changes to zero or a negligible magnitude.

This invention pertains to a constant current generator and more particularly to such a device which can be used as either a constant current source or a constant current sink.

Constant current generators have many uses in the electronics art. One prime application is concerned with voltage ramp generators. In such a device an output voltage varies linearly with time. Ramp generators are used in the voltage comparison circuits of analog-to-digital converters or in the sweep circuits of radar and television displays. In these electronic systems, the more linear the voltage ramp the less error in the system. The ramp voltage is generally obtained from the voltage developed across a charge accumulating device such as a capacitor. In order to obtain a linear voltage, a constant current must be fed to the charge accumulating device.

It is, accordingly, a general object of the invention to provide an improved constant current generator.

It is another object of the invention to provide an improved constant current generator which is negligibly sensitive to changes in circuit parameters due to age and temperature.

It is a further object of the invention to provide a constant current generator which while satisfying the abovementioned objects is very easy and inexpensive to fabricate.

Briefly, the invention contemplates a constant current generator which includes a three-terminal current amplifier means and a differential amplifier means. The three-terminal amplifier means comprises a current flow terminal, a control terminal and a signal output terminal. The current flow terminal is connectable to a constant current utilization device. The control terminal controls the current flow through the current flow terminal; and the signal output terminal transmits a signal related to the current flowing through the current flow terminal. The differential amplifier means includes a common terminal, an input signal receiving terminal and a control signal output terminal. The input signal receiving terminal receives the signal transmitted by the signal output terminal of the three-terminal current amplifier means. The reference signal receiving means receives a reference signal. The control signal output terminal transmits a control signal related to the difference between the reference signal and the signal received from three-terminal current amplifier means which is related to the current flowing therethrough. The control signal is negatively fed back to the control terminal of the three-terminal current amplifier means to control the current flowing through the current flow terminal. Therefore, if the current flowing through the current flow terminal deviates from a predetermined constant value, the current is urged back to the constant value.

Other objects, features and advantages of the invention will be apparent from the following description, when read with the accompanying drawing which shows, by way of example and not limitation, the now preferred form of the invention.

Figure 1:
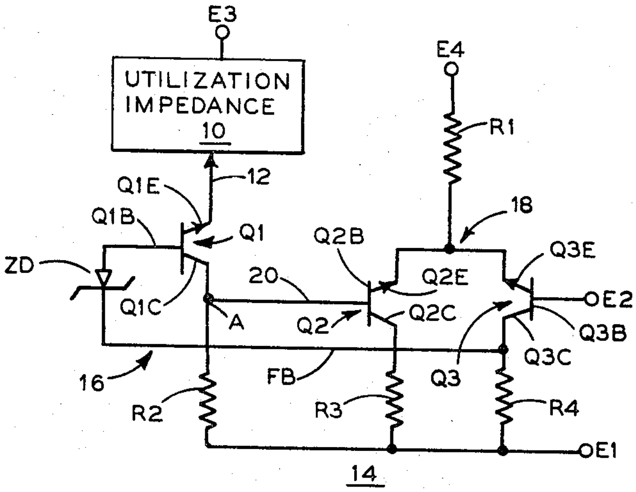
FIG. 1 shows, schematically, a constant current generator, operating as a constant current source, in accordance with one embodiment of the invention.

Referring now to FIG. 1, utilization impedance 10 is fed a constant current $I_0$ via lead 12 from constant current generator 14 comprising three-terminal current amplifier 16 and differential amplifier means 18.

Three-terminal current amplifier means 16 comprises N-P-N transistor Q1 having: an emitter terminal Q1E (current flow terminal) connected to lead 12; a base terminal Q1B (control terminal); and a collector terminal Q1C connected to junction A. Junction A is connected via resistor R2 (a first impedor) to source of voltage E1.

The differential amplifier means 18 comprises N-P-N transistors Q2 and Q3, each including base, emitter and collector terminals. Emitter terminals Q2E and Q3E (common terminal) are connected to a current bias source including resistor R1 and source of voltage E4. The base terminal Q2B of transistor Q2 is the signal input receiving terminal of the differential amplifier means and is connected, via lead 20, to junction A. The collector terminal Q2C is connected, via voltage dropping resistor R3, to source of voltage E1. The base terminal Q3B of transistor Q3 is the reference signal receiving terminal of the differential amplifier means and is connected to a source of reference voltage E2. The collector terminal Q3C of transistor Q3 is the control signal output terminal of the differential amplifier means and is connected, via resistor R4 (second impedor), to voltage source E1. A feedback means FB including a voltage dropping means, in the form of a Zener diode ZD, connects the collector terminal Q3C to the base terminal Q1B. It should be noted that the potential of source of voltage E1 is greater than that of source of reference voltage E2 which is greater than that of source E4.

During operation current flows from source of voltage E1 via resistor R2, transistor Q1 and lead 12 to utilization impedance 10. The current through resistor R2 develops a signal at junction A which is fed via line 20 to the base terminal Q2B of transistor Q2. This signal is compared with the reference signal received by the base terminal Q3B of transistor Q3 causing a current to flow through resistor R4. The current flow through resistor R4 develops a control signal at the collector terminal Q3C of transistor Q3 which is transmitted via feedback means FB to the base terminal Q1B of transistor Q1.

The parameters are chosen so that a given constant current $I_0$ normally flows in lead 12. If this current increases, the voltage at junction A (and at base terminal Q2B) drops. Less current flows through transistor Q2 and more current flows through transistor Q3. The increase of current flow through transistor Q3 causes a drop in the voltage at collector terminal Q3C. This voltage drop is fed to the base terminal Q1B causing a decrease in the current flow through transistor Q1 and the output current is forced back to the predetermined constant value. A similar analysis shows that when the current in lead 12 tends to decrease, this current is forced back to the predetermined value.

Mathematically, it can be shown that (1) $I_o = I_s + \alpha(-I_B + I_i)$ where $I_o$=current in lead 12 (emitter current)
$I_B$=current in lead 20
$I_i$=current through resistor R2
$I_s$=spurious current due to drift
$\alpha$=gain of transistor Q1

It is known that the current $I_B$ is very much less than current $I_i$ and small changes in its magnitude do not have any appreciable effect. Therefore, by taking this fact into account, $I_o = I_s + \alpha I_i$. Now, since $I_i$ is very much greater than $I_s$, as a practical matter, $I_o = \alpha I_i$. It should be apparent that, if current $I_i$ is maintained constant, current $I_o$ will be constant. Current $I_i$ will be constant if the voltage across resistor R2, i.e., $V_A - V_{E1}$ is constant. Now, (2) $V_A - V_{E1} = V_{BE2} - V_{BE3} + (V_{E2} - V_{E1})$ where $V_A$=voltage at junction A
$V_{E1}$=voltage of source E1
$V_{BE2}$=voltage across base-emitter junction of transistor Q2
$V_{BE3}$=voltage across base-emitter junction of transistor Q3
$V_{E2}$=voltage of source E2

Simplifying yields, $V_A = V_{BE2} - V_{BE3} + V_{E2}$. This relationship arises by virtue of the differential amplifier means and the feedback circuit. Now, it is known that $V_{BE2}$ and $V_{BE3}$ are small compared with $V_{E2}$, and therefore, any differential changes in their magnitude with temperature and the like are very small compared with $V_{E2}$. Therefore, $V_A$, and, consequently current $I_o$, will be constant if reference voltage $V_{E2}$ is maintained essentially constant. It should, accordingly, be noted that the constant output current is not dependent on the parameters of impedance 10 any any voltage E3 associated therewith, provided transistor Q1 is conducting. Similarly, fractional changes in resistors R1, R3 and R4, as well as, the voltage drop across diode ZD will result in negligible changes in current $I_o$ so that the exact value of their parameters or small changes in their values due to aging, temperature and other effects are not important.

Figure 2:
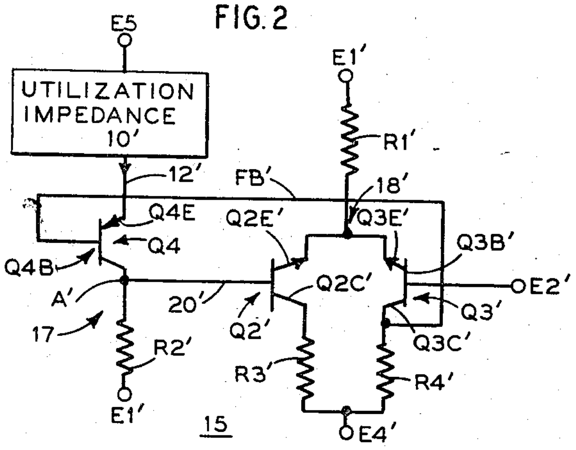
FIG. 2 is a schematic diagram of an alternate embodiment of the invention for use as a constant current sink.

Referring now to FIG. 2 a constant current drain 15 is shown. Current drain 15 draws a constant current via line 12' from utilization impedance 10'. Since constant current drain 15 is similar in most respects to constant current source 14, primed reference characters will be employed and only the differences will be noted. In particular, P-N-P transistor Q4 is utilized for three-terminal current amplifier 17 and no voltage dropping means is required in the feedback circuit FB'. In addition, voltage source E5 is at a higher potential than source E1' whereas in the embodiment of FIG. 1 voltage source E3 is at a lower potential than source E1. Since current drain 15 operates in the same manner as current source 14, its operation will not be repeated.

Figure 3:
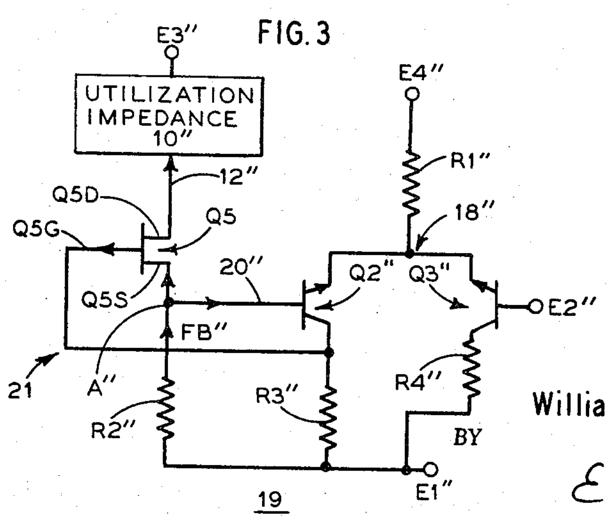
FIG. 3 shows schematically, an alternate embodiment of the constant current source of FIG. 1.

Referring now to FIG. 3 which shows an alternate embodiment of the constant current generator 14 of FIG. 1. The basic difference resides in the replacement of the three-terminal current amplifier 16 of generator 14 by the three-terminal current amplifier 21 in the constant circuit generator 19 of FIG. 3. In particular, the N-P-N transistor Q1 is replaced by the P-channel field effect transistor Q5 having a gate terminal Q5G, a source terminal Q5S and a drain terminal Q5D. The drain terminal Q5D is connected via lead 12" to utilization impedance 10". The source terminal Q5S is connected to junction "A." The gate terminal Q5G is connected via a feedback means FB" to the collector of transistor Q2". (The double primed reference characters indicate the identity of the elements of FIG. 3 with the corresponding elements of FIG. 1.) It should be noted that the embodiment of FIG. 3 does not require a breakdown diode in the feedback means. With these changes, it can be shown that (3) $I_o = I_c = (-I_B + I_i)$ where $I_o$=current in lead 12' (drain current)
$I_c$=current into source terminal Q5S
$I_B$=current in lead 20"
$I_i$=current through resistor R2".

In such a case the error terms $I_s$ and $\alpha$ of Equation 1 are eliminated and a greater degree of constancy is obtained.

Although an equivalent of the constant current drain 15 of FIG. 2 utilizing a P-channel field-effect transistor in place of P-N-P transistor Q4 such a circuit is readily obtainable by following the teachings of the embodiment of FIG. 3.

While a limited number of embodiments of the invention have been shown and described in detail, there will now be obvious to those skilled in the art many modifications and variations which satisfy many or all of the objects of the invention but which do not depart from the spirit thereof, as defined by the appended claims. For example, instead of employing a breakdown diode for a voltage dropping means, a series of forward biased diodes, a resistor or similar circuit device could be employed. In addition, while the transistors Q1, Q2 and Q3 are shown as junction type transistors other three-terminal current amplifying devices could be employed. Likewise, transistors which are complementary to those shown can be used provided all voltage polarities are reversed. Furthermore, resistor R3 can be replaced by a short circuit or a complex impedance as long as transistor Q2 is in the active region and has a large positive current gain between its base and collector terminals.

What is claimed is:

1. A constant current generator comprising: a three-terminal current amplifier means including a first transistor having an emitter as a current flow terminal, a base as a control terminal, and a collector as a signal output terminal; a differential amplifier means comprising second and third transistors each having base, emitter and collector terminals, the base of the second transistor comprising the input signal receiving terminal, the collector terminal of the third transistor comprising the control signal output terminal, the emitter terminals of the second and third transistors being connected to each other to form the common terminal; a reference signal voltage source connected to the base of the third transistor; means for connecting the signal output terminal of the first transistor to the input signal receiving terminal of the differential amplifier means; feedback means for connecting the control signal output terminal of the differential amplifier means to the control terminal of the first transistor for feeding back a signal related to the difference between the signal received at the base of the third transistor and the signal received at the input signal receiving terminal of the differential amplifier means; a first source of voltage; a first impedor connecting the first source of voltage to the collector of the first transistor; a current bias source connected to the common terminal of the differential amplifier means; and a second impedor connected between the collector terminal of the third transistor and the first source of voltage.

2. The constant current generator of claim 1 wherein said first transistor is a field-effect transistor.

3. The constant current generator of claim 2 wherein said current bias source includes a voltage source and a resistor for connecting the voltage source to the emitters of said second and third transistors.

4. The constant current generator of claim 1 wherein said first transistor is of the P-N-P type so that the constant current generator acts as a constant current sink.

5. The constant current generator of claim 1 wherein said first transistor is of the N-P-N type so that the constant current generator acts as a constant current source.

6. The constant current generator of claim 5 wherein said feedback means includes voltage level dropping means connected between the collector terminal of said third transistor to the base terminal of said first transistor.

7. The constant current generator of claim 6 wherein said voltage level dropping means is a Zener diode.

8. The constant current generator of claim 7 wherein a resistor connects the collector terminal of said second transistor to said first source of voltage.

References Cited

UNITED STATES PATENTS

| | | | |
|---|---|---|---|
| 3,099,791 | 7/1963 | Turner | 323—9 X |
| 3,125,715 | 3/1964 | Brooks | 323—9 X |
| 3,353,091 | 11/1967 | Matsumoto | 323—4 |

JOHN F. COUCH, *Primary Examiner.*

A. D. PELLINEN, *Assistant Examiner.*